United States Patent

Trimble et al.

[15] 3,640,678
[45] Feb. 8, 1972

[54] YTTRIUM PURIFICATION PROCESS

[72] Inventors: Carter H. Trimble; David B. Strott, both of Lakewood, Colo.

[73] Assignee: Molybdenum Corporation of America, New York, N.Y.

[22] Filed: June 1, 1970

[21] Appl. No.: 42,045

[52] U.S. Cl. ..................................23/22, 23/23, 23/24 R, 23/312 ME
[51] Int. Cl. .......................................................C22b 59/00
[58] Field of Search ...................................23/18–20, 22–24, 23/312 ME

[56] References Cited

UNITED STATES PATENTS

| | | | |
|---|---|---|---|
| 3,575,687 | 4/1971 | Drobnick et al. | 23/22 |
| 3,578,391 | 5/1971 | Chiola et al. | 23/22 |
| 3,582,264 | 6/1971 | Chiola et al. | 23/23 |
| 3,514,267 | 5/1970 | Sherrington et al. | 23/312 ME |
| 3,110,556 | 11/1963 | Peppard et al. | 23/23 |
| 3,409,415 | 11/1968 | Moore | 23/23 X |
| 3,230,036 | 1/1966 | Kappelmann et al. | 23/78 X |
| 3,482,932 | 12/1969 | Gump | 23/22 |

*Primary Examiner*—Herbert T. Carter
*Attorney*—Morgan, Finnegan, Durham & Pine

[57] ABSTRACT

Pure yttrium values are isolated continuously from aqueous solutions of yttrium and rare earth values in a two or three circuit liquid—liquid extraction system using an amine extractant in one circuit to remove lower atomic number rare earth values and a (halodi- or trialkyl)alkanoic acid extractant in the other circuit or circuits to remove higher atomic number rare earth values. Efficiency is enhanced by using a salting out agent in the amine extractant circuit and separating the yttrium values from the salting out agent by extraction in an intermediate carboxylic acid extractant circuit.

17 Claims, 2 Drawing Figures

YTTRIUM PURIFICATION PROCESS

The present invention relates to a process for the selective solvent extraction, separation and recovery of metal values from aqueous feed solutions. More particularly, it relates to a process for isolating pure yttrium from all other rare earths by treating an aqueous solution of yttrium and rare earth values with a first organic extractant followed by a second organic extractant.

BACKGROUND OF THE INVENTION

The present invention contemplates a double solvent extraction process adapted to the treatment of an aqueous solution containing therein values of difficult to separate metals. The present invention is specifically adapted to separation and recovery of yttrium values from mixtures with rare earth metal values in aqueous solutions.

Yttrium, the product of the present process is valuable for a number of uses, for example, as a "getter" in vacuum tubes and in the production of yttrium hydride as a neutron moderator.

Although yttrium has an atomic number of 39, it behaves in an anomalous fashion in that it reacts very similarly to the rare earth metals of the lanthanide group, which have atomic numbers ranging from 57 to 71. In fact, yttrium usually occurs in materials together with the rare earths and any attempt to develop processes to provide pure yttrium requires separation from the rare earths. The rare earths are very difficult to separate one from the other because of their similar properties and yttrium itself is difficult to isolate because it usually behaves as if it had an atomic number of 67 to 68, which is right in the middle of the lanthanide group.

In the copending application of Enzo L. Coltrinari and James K. Kindig, Ser. No. 881,742, filed Dec. 3, 1969, and assigned to the assignee of the present application, there is disclosed a two-stage countercurrent leaching process for the recovery of phosphates, yttrium and rare earth values from solid materials such as ores and commercial residues. The product of the process of the copending application is an aqueous acid strip solution containing yttrium values and rare earth values in admixture. Such a solution is illustrative of the types of streams to be employed in the yttrium recovery and purification operations with which the present invention is concerned.

It is known that an aqueous solution of yttrium values and rare earth values can be subjected to extraction with an organic alkyl phosphate extractant which removes yttrium values and heavier rare earth values, leaving lighter rare earths in an aqueous raffinate. Stripping the extractant with aqueous mineral acid and adding thiocyanate ion then provides an aqueous medium which can be solvent extracted with an alkyl phosphate to remove the heavier rare earths, leaving yttrium in the strip solution.

Such a process has many serious disadvantages. Among them is the need to scrub out thiocyanic acid before the final extraction because it ties up the solvent and thereby impairs extraction. Furthermore, the separation factors using the alkyl phosphate esters to extract the thiocyanate-loaded strip are very low and many stages are required to separate yttrium from the heavy rare earth values.

A most serious difficulty with such prior art processes are rather low separation factors for the so-called critical elements, holmium, erbium and dysprosium. Higher separation factors than are provided by prior art systems are needed for these elements in order to provide a superior process to purify yttrium. Higher separation factors for these critical elements imply higher purity in a fixed number of stages or equal purity in fewer stages. Higher production capacity also results.

Considerable efforts have been expended by those skilled in the art to develop improved solvent extraction techniques to separate and recover metal values from such aqueous solutions. A large amount of the effort has been directed toward improving solvent selectivity and, in consequence, a large background of knowledge exists on the many solvents which have been suggested for this purpose.

It has been found by an application of these techniques that a system comprising two extractants, an amine and a (halodi- or trialkyl)alkanoic acid of from eight to 11 carbon atoms, can be employed to separate yttrium values from associated rare earth values in an unexpectedly efficient manner. The system must be used in a continuous fashion. Its efficiency in the separation of the critical elements holmium, erbium and dysprosium from yttrium is outstanding in comparison with the prior art process.

The efficiency of the present system is illustrated in part by the data plotted in FIG. 1. The separation factor for each rare earth from terbium through ytterbium with respect to yttrium are shown for the amine extractant and the alkanoic acid extractant. It is seen that the lines cross at erbium and yttrium appears to have an atomic number about the same as the lower rare earth, terbium, in the aliphatic acid extractant and has an apparent atomic number between that of the higher rare earths, thulium and ytterbium, in the amine extractant system.

In contrast to the prior art method which uses a thiocyanate ion loaded strip solution as feed to an alkyl phosphate circuit, the separation factors for the aforesaid critical elements are very high in both of the extractant systems of the present invention.

It is accordingly an object of the present invention to provide an improved, continuous process to isolate yttrium values from aqueous mixtures of rare earth values.

It is a further object of the invention to provide an alkanoic acid extractant medium for use with separate amine extractant circuits in continuous systems to isolate yttrium from aqueous solutions containing rare earth values.

It is another object of this invention to provide a process for continuous production of yttrium values with continuous withdrawal of heavier and lighter rare earth byproducts.

DESCRIPTION OF THE INVENTION

The above valuable objects and additional objects apparent to those skilled in the art from the disclosure herein are easily achieved by practice of the present invention which is a continuous process for the separation and purification of yttrium values from all associated rare earth values.

The present process employs two or three liquid-liquid extraction circuits, one for the removal of the lighter members of the rare earth group, i.e., lanthanum through erbium, and the other one or two for removing the heavy members of the rare earth group, i.e., thulium through lutetium, from the yttrium.

One circuit uses an amine as the specific light rare earth extractant and it is preferred to extract in the presence of a salting out agent.

The aqueous phase from the amine extractant circuit serves as feed stock for another circuit which uses a (halodi- or trialkyl)alkanoic acid of from eight to 11 carbon atoms as the heavy rare earth extractant. The order of the circuits is not material to the invention. Either the amine circuit or the acid circuit can comprise the first circuit in the continuous system. For the purposes of this disclosure, the system will be described with the amine circuit first—and the acid circuit or circuits following.

If a salting out agent is used, it is preferred to transfer the aqueous phase from the amine circuit to the acid circuit via an intermediate acid extractant circuit using the same alkanoic acid used in the final circuit. This serves the dual purpose of making feed for the final circuit and separating the yttrium values from salting out agent, which can be recycled back to the amine circuit.

In accordance with the present invention there is provided a process for recovering yttrium values from an aqueous solution containing yttrium values in admixture with heavier and lighter rare earth values which comprises continuously:

a. contacting said solution with an amine as an extractant whereby said lighter rare earths are extracted into an organic phase while said yttrium values and said heavier rare earth values remain in the aqueous phase and separating said aqueous phase;

b. contacting the aqueous phase from step (a) with a (halodi- or trialkyl)alkanoic acid of from about eight to 11 carbon atoms as an extractant whereby said yttrium values and said heavier rare earth values are extracted into an organic phase and separating said organic phase;

c. contacting the organic phase from step (b) with an aqueous acid whereby said yttrium values are taken up into an aqueous acid scrub solution while said heavier rare earth values remain in said organic phase and separating said scrub solution; and d. recovering the yttrium values from the scrub solution from step (c).

Preferred features of this invention are:

A process wherein a salting out agent is added to the solution in step (a) and said salting out agent remains in the aqueous phase together with the yttrium values and said heavier rare earth values. Suitable salting out agents are water soluble nitrates of alkali metals, e.g., sodium nitrate or potassium nitrate, alkaline earth metals, magnesium nitrate or calcium nitrate, and nitrates of ammonia or amines, e.g., ammonium nitrate, dimethylammonium nitrate, and the like. Magnesium nitrate is the most effective salting out agent and 3-molar concentration in nitrate ion is preferred. The salting out agent will remain in the aqueous phase in step (b) if the pH is adjusted to at least 4.0 during the contacting step. As has been mentioned above, the salting out agent can be discarded or recycled back to the feed introduced in step (a).

There can be employed as the amine in step (a) primary, secondary, tertiary and quaternary amines which are substantially water insoluble and which exhibit selectivity for the lighter rare earth values. Illustrative are primary amines in which the organic radical or radicals are aryl, alkyl or alkenyl groups containing at least six carbon atoms or a sufficient number of carbon atoms to impart low water solubility and high organic solubility, e.g., amines having the structure

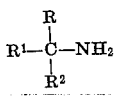

where $R+R^1+R^2$ contain 15 to 21 carbon atoms; secondary amines having two such groups in any combination and a total of at least six carbon atoms, e.g., bis(methylbenzyl)amine, bis(decyl)amine, bis(tridecyl)amine, bis(1-isobutyl-3,5-dimethylhexyl)amine and the like; and tertiary amines having such groups and a total of at least six carbon atoms, e.g., tris(tridecyl)amine, tris(amyl)amine, tris(isooctyl)amine, and the like. Especially preferred amines are a mixture of tertiary alkyl primary amines having from 18 to 21 carbon atoms or a water insoluble quaternary ammonium salt containing from 18 to 25 carbon atoms made by the alkylation, e.g., with a $C_1$-$C_6$ alkyl halide, of a straight chain saturated tertiary amine. The former are commercially available, e.g., from Rohm and Haas Company under the trade name "Primene JM–T" and the latter from General Mills, Inc., under the trade name "Aliquat." It is preferred to use as the extractant in step (a) the amine, tricaprylyl methyl ammonium nitrate, i.e., Aliquat 336.

The acid extractant used in step (b) in the process of this invention is a (halodi- or trialkyl)alkanoic acid of from about eight to 11 carbon atoms. Halo is preferably bromo. Preferably the alpha carbon atom is trialkyl- or bromodialkyl-substituted.

Preferred acids used as the extractant in step (b) are either a mixture of isomers of 2-methyl-2-butyl pentanoic acid with an average molecular weight of about 174, or 2-bromo-2-ethylhexanoic acid. Other suitable acids include 2-methyl-2-butylbutanoic, 2-methyl-2-propylbutanoic, 2-methyl-2-butylhexanoic, 2-chloro-2-ethylhexanoic and 2-bromo-2-butylheptanoic acid.

Another preferred feature of this invention is to carry out steps (a) and (b) with the amine and acid extractants dissolved in an organic diluent. This lowers the viscosity and improves phase separation. In these embodiments, it is preferred that the extractant-diluent solution have a content of from about 10 to about 50 percent by volume of the extractant in total organic mixture. In step (a), preferred results are obtained if the amine content comprises between 15 and 35 percent by volume of the extractant-diluent solution. On the other hand, preferred results are obtained if the acid extractant content of step (b) comprises about 50 percent by volume of the extractant-diluent solution.

While the nature of the diluent is not particularly critical it should have a relatively low degree of miscibility with water to aid in rapid separation, without emulsification problems. Suitable diluents are, for example, toluene, n-heptane, kerosene and benzene. An especially preferred diluent is a hydrocarbon solvent comprising high boiling aromatics, the major constituents being the three isomeric trimethylbenzenes. This is commercially available from Shell Chemical Company under the trade name, "Shellsol A—Cyclosol-53." Also preferred is "Napoleum 110," an aliphatic hydrocarbon, b.p. 342°–384° C., from Kerr-McGee.

As has been mentioned above, all of the advantages of the present process are obtained only if it is carried out in a continuous fashion. In a preferred continuous process, the steps will comprise:

a. contacting said solution in a first liquid-liquid solvent extraction circuit with a barren extractant comprising an amine and countercurrently scrubbing with a mineral acid solution containing said salting out agent whereby the lighter members of the rare earth group are transferred into the extractant, leaving the yttrium values, the heavier rare earth values and the salting out agent in the aqueous phase;

b. contacting said aqueous phase in a second liquid-liquid circuit with a barren extractant comprising a water-insoluble (halodi- or trialkyl)alkanoic acid of from about eight to about 11 carbon atoms and countercurrently scrubbing and stripping with a mineral acid solution whereby the yttrium values and the heavier rare earth values are transferred to the extractant, leaving the salting out agent in the aqueous phase;

c. contacting the extractant from step (b) in a third liquid-liquid circuit with a barren extractant comprising a (halodi- or trialkyl)alkanoic acid of from about eight to about 11 carbon atoms and countercurrently selectively scrubbing with a mineral acid solution whereby the yttrium values are transferred to the aqueous scrub solution, leaving the heavier rare earth values in the extractant and separating the scrub solution; and d. recovering the yttrium values from the separated scrub solution.

In an embodiment, the extractant loaded with light rare earth values from the first circuit and the extractant loaded with heavy rare earths from the last circuit are each stripped with a mineral acid solution until barren and then recycled.

A preferred embodiment is such a continuous process wherein the aqueous mixture fed to the system contains one or more rare earth values with atomic number between 57 and 71 and yttrium values and, in step (a), said first circuit extractant is tricaprylyl methyl ammonium nitrate at 37 percent by volume in an aromatic hydrocarbon diluent, the scrubbing solution is an aqueous mineral acid at 2 N concentration, 3 M in magnesium nitrate, and lanthanum through erbium values, if present, load on the extractant, leaving yttrium values and thulium, ytterbium and lutetium values, if present in the aqueous phase;

in step (b) the second circuit extraction is carried out at pH 4.0–5.8 and yttrium values and thulium, ytterbium and lutetium values, if present, load on the (halodi- or trialkyl)alkanoic acid extractant, leaving the salting out agent in the aqueous phase and in step (c) the loaded extractant is fed to the third liquid-liquid circuit, the scrubbing solution is 2.0 N aqueous mineral acid and yttrium values are stripped, leaving thulium, ytterbium and lutetium values, if present, loaded on the alkanoic acid extractant.

Figure 1:
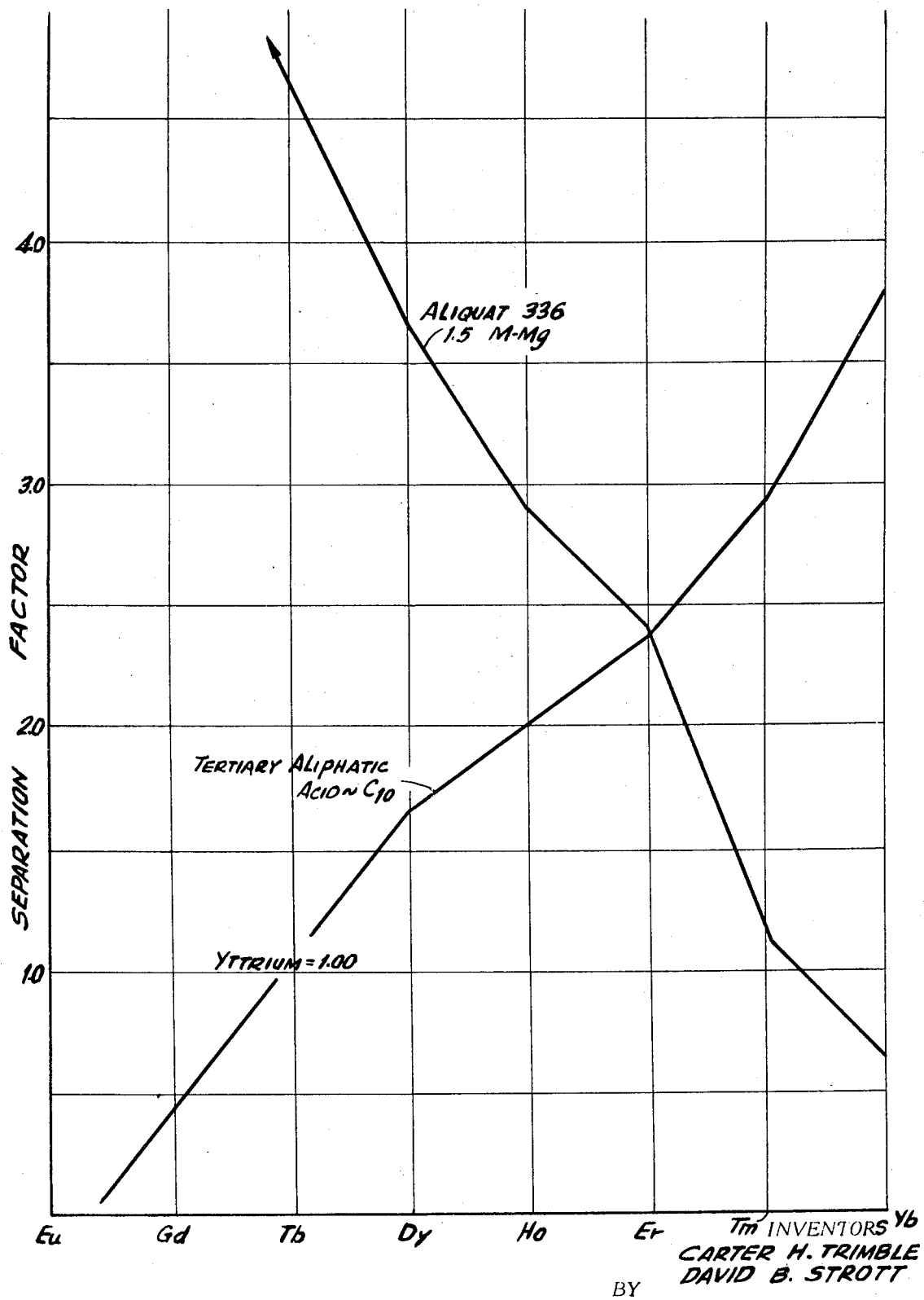
FIG. 1 shows the separation factors for the various rare earths and yttrium as a function of increasing atomic number. The data are obtained using (a) tricaprylyl methyl ammonium nitrate as the amine extractant and (b) a mixture of isomers of 2-methyl-2-butylpentanoic acid as the acid extractant. The procedure is described in Example 1.

The organic phases containing extracted metal values in the first, second and third circuits are scrubbed, stripped and back extracted in accordance with techniques well known to those skilled in the art. This is generally accomplished by contacting with an aqueous mineral acid solution. Sulfuric, nitric or hydrochloric acid, and the like, are suitable. It is preferred to use an acid with an anion common to that of the metal values, i.e., if yttrium and rare earth nitrates are used, the mineral acid solution will be nitric acid.

Generally, the pH of the aqueous phase in the first circuit will be maintained at 0.2 to 5.0. Increasing the acid content to 1.0 N and higher will cause a slight decrease in extraction efficiency of the lighter rare earths in this circuit.

The pH of the aqueous phase in an intermediate, i.e., second, circuit (if salting out agent is used and is to be removed) will be maintained generally at 4.0 to 5.8. Aqueous ammonia or an alkali, e.g., sodium or potassium hydroxide, can be added to achieve this, using, e.g., 0.2–1.0 N mineral acid to scrub out the cation of the salting out agent. Excellent separation of the yttrium values from alkaline earths, e.g., magnesium and calcium, can be achieved by controlling the pH in such ranges.

The pH of the aqueous phase (scrub solution) in the final circuit where the alkanoic acid extractant is used will be maintained generally at 3.5 to 4.5 and especially preferably at 3.5 to 3.9. This accomplished by using mineral acid of about 2–4 N as a strip and scrub solution.

As will be shown in the examples, the process should be carried out in a continuous fashion, and countercurrent flow patterns can be used. Column operation or mixer-settlers can be used.

Yttrium values isolated by the process will be found in the acid scrub solution from the final circuit. Yttrium metal is recovered from them by means well known to those skilled in the art. One such process comprises adding oxalic acid to the scrub solution to precipitate yttrium as the oxalate. In another process the yttrium values, e.g., yttrium nitrate, can be converted to the trifluoride, which in turn is reduced by calcium metal in a refractory lined sealed crucible as described in U.S. Pat. No. 2,950,962.

As will be obvious to those skilled in the art various additives may be used at different stages of the liquid-liquid extraction process. These will include surfactants, dispersing and wetting agents that are soluble in the diluent and in the extractant and aid in phase separation. Additives are selected so that they do not adversely effect the selectivity of the extractants for the metal values. One such additive is tridecanol, which can be varied over a fairly broad range of concentration to achieve the desired results. Generally up to about 5 percent by volume will be used and it is observed that optimum phase separation will occur when the tridecanol content is about 4 percent by volume of extractant-diluent.

DESCRIPTION OF THE PREFERRED EMBODIMENTS

The following examples illustrate the process of the present invention.

EXAMPLE 1

A liquid-liquid extraction process is carried out with an amine extractant on an aqueous solution containing yttrium values and rare earth values of the composition in Table I:

TABLE I

| Composition of a Typical Rare Earth and Yttrium Mixture (Oxide Basis) | |
|---|---|
| $Pr_6O_{11}$ | 0.97 |
| $Nd_2O_3$ | 6.46 |
| $Sm_2O_3$ | 5.51 |
| $Eu_2O_3$ | 0.51 |
| $Gd_2O_3$ | 9.42 |
| $Tb_4O_7$ | 2.04 |
| $Dy_2O_3$ | 11.40 |
| $Ho_2O_3$ | 2.00 |
| $Er_2O_3$ | 5.02 |
| $Tm_2O_3$ | 0.60 |
| $Yb_2O_3$ | 3.01 |
| $Y_2O_3$ | 52.20 |

Two hundred and fifty ml. of a solution containing 25 percent by volume of amine extractant (tricaprylyl methyl ammonium nitrate, Aliquat 336-nitrate), 5 percent by volume of tridecanol to assist in phase separation and 70 percent by volume of aromatic hydrocarbon diluent (Cyclosol–53) is contacted in a separatory funnel for 2 minutes with 50 ml. of a solution containing 180 g./l. of the yttrium and rare earth oxides as the nitrate salts, 1.5 molar $Mg(NO_3)_2$ salting out agent and 0.1N in $HNO_3$. The phases are allowed to separate and each phase is analyzed for total and individual rare earths and yttrium. The organic phase contains 21.7 g./l. REO and the aqueous phase contains 77.9 g./l. REO. The separation factors for each rare earth with respect to yttrium are shown in FIG. 1.

These analytical results demonstrate that the lighter rare earths are preferentially extracted and yttrium values and heavy rare earth values remain in the aqueous phase. Affinity for the rare earths decreases with increasing atomic number.

EXAMPLE 2

The procedure of Example 1 is repeated except that the amine, Aliquat–336, content is varied from 15 to 35 percent by volume in the extractant-diluent phase. Light rare earth content of the organic phase increases as the Aliquat–336 content increases. The separation factors remain constant.

EXAMPLE 3

The procedure of Example 1 is repeated except that the tridecanol content is varied from 0 to 5 percent by volume. Light rate earth content of the organic phase decreases with increasing tridecanol content. The separation factors remain constant. Optimum phase separation occurs when the tridecanol content is about 4 percent.

EXAMPLE 4

The procedure of Example 1 is repeated except that the acidity of the aqueous phase is varied from pH 0 to 5. Rare earth content of the organic phase is essentially constant over the pH range of 0.8 to 5.0, but decreases as the acid content is increased to 1.0 N. The separation factors remain constant.

EXAMPLE 5

The procedure of Example 1 is repeated except that $NaNO_3$, $NH_4NO_3$ and no salting-out agent are substituted for the $Mg(NO_3)_2$. A 3-molar concentration of nitrate ion is used in each case except where no salting-out agent is used. The rare earth content of the organic phase increases in the order: no salting agent $<NH_4NO_3<NaNO_3<Mg(NO_3)_2$, and $Mg(NO_3)_2$ is the most effective salting out agent. The separation factors remain constant in all cases.

EXAMPLE 6

A liquid-liquid extraction process is carried out with an extractant comprising a trialkylalkanoic acid of 10 carbon atoms on an aqueous solution containing rare earth values of the composition in Table II:

TABLE II

| Composition of Rare Earth and Yttrium Mixture (Oxide Basis) | |
| --- | --- |
| $Dy_2O_3$ | 0.48 |
| $Ho_2O_3$ | 0.90 |
| $Er_2O_3$ | 1.81 |
| $Tm_2O_3$ | 1.01 |
| $Yb_2O_3$ | 5.94 |
| $Y_2O_3$ | 89.90 |

This mixture is similar to the composition of the product stream resulting from amine extraction according to Examples 1–5.

An extractant comprising 50 percent by volume of a mixture of isomers of 2-methyl-2-butylpentanoic acid, with an average molecular weight of about 174, in aromatic hydrocarbon Cyclosol–53 diluent is prepared. A 250 ml. portion of this organic solution is loaded with rare earths by bringing it into contact with 90 ml. of the rare earth solution containing about 135 g./l. of rare earth oxides. Aqueous ammonia is added to the mixture until the aqueous phase is free of rare earths and the phases are allowed to separate. The aqueous phase is discarded and the organic phase is equilibrated with a fresh 85 ml. portion of the synthetic aqueous feed solution at a pH of 3.5 to 3.9.

The separated phases are analyzed for total rare earths and individual rare earths. The organic phase contains 49.0 g./l. of rare earth oxides and the aqueous phase contains 135.8 g./l. of rare earth oxides. The separation factors for each rare earth with respect to yttrium are shown in FIG. 1.

These analytical results demonstrate that the heavier rare earths are extracted in preference to the yttrium values. Affinity for the rare earths increases with increasing atomic number.

EXAMPLE 7

The procedure of Example 6 is repeated except that the rare earth content of the organic phase is varied from 25 to 50 g./l., while the aqueous phase is varied from 45 to 175 g./l. of contained rare earth oxides. The pH is held between 3.5 to 4.5 in all cases. The separation factors remain essentially constant.

EXAMPLE 8

The procedure of Example 6 is repeated using a 25 percent by volume solution of 2-bromo-2-ethylhexanoic acid in an aliphatic hydrocarbon diluent (Napoleum 110, from Kerr McGee Corp.) as the organic phase and a rare earth-yttrium nitrate solution of the composition shown in Table I as the aqueous phase. The diluent had a boiling range of 342°–384° F.; Flash point, T.C.C., of 120° F.; and Spec. Grav. at 60° F. of 0.788.

The equilibrated phases are separated and analyzed with the following results:

The organic phase contains 40.2 g./l. of rare earth oxides and the aqueous phase contains 171.8 g./l. of rare earth oxides at a pH of 2.85. The rare earth separation factors with respect to yttrium are as follows:

| Eu | 0.76 | Ho | 1.49 |
| --- | --- | --- | --- |
| Gd | 0.77 | Er | 1.75 |
| Tb | 1.02 | Tm | 2.05 |
| Dy | 1.43 | Yb | 2.36 |
|    |      | Y  | 1.00 |

These data demonstrate that the use of a bromodialkylalkanoic acid, an aliphatic diluent and a lower pH range are useful to obtain excellent rare earth separation factors.

EXAMPLE 9

A liquid-liquid extraction technique is used to separate the salting-out agent in an intermediate circuit.

One hundred and fifty milliliters of solution containing 50 percent by volume of trialkylakanoic acid comprising a mixture of isomers of 2-methyl-2-butylpentanoic acid, with an average molecular weight of about 174, in Cyclosol–53 diluent is contacted with 180 ml. of an aqueous solution containing 36 g./l. of $Y_2O_3$, 42 g. per liter Mg and 1.08 g./l. Ca as the nitrate salts. Increments of aqueous ammonia are added to slowly raise the pH of the aqueous phase. For each pH interval, a sample of the organic phase is taken for Ca and Mg analysis and a sample of the aqueous phase is taken for $Y_2O_3$ and pH determination.

Extraction of yttrium is essentially quantitative at pH 4 to 4.5. On the other hand, at this pH, less than 0.5 percent of calcium and magnesium are extracted. Above pH 5 the percent extractability of the alkaline earths increases sharply.

The data demonstrate that an efficient separation of yttrium from alkaline earths can be achieved by pH control.

EXAMPLE 10

Figure 2:
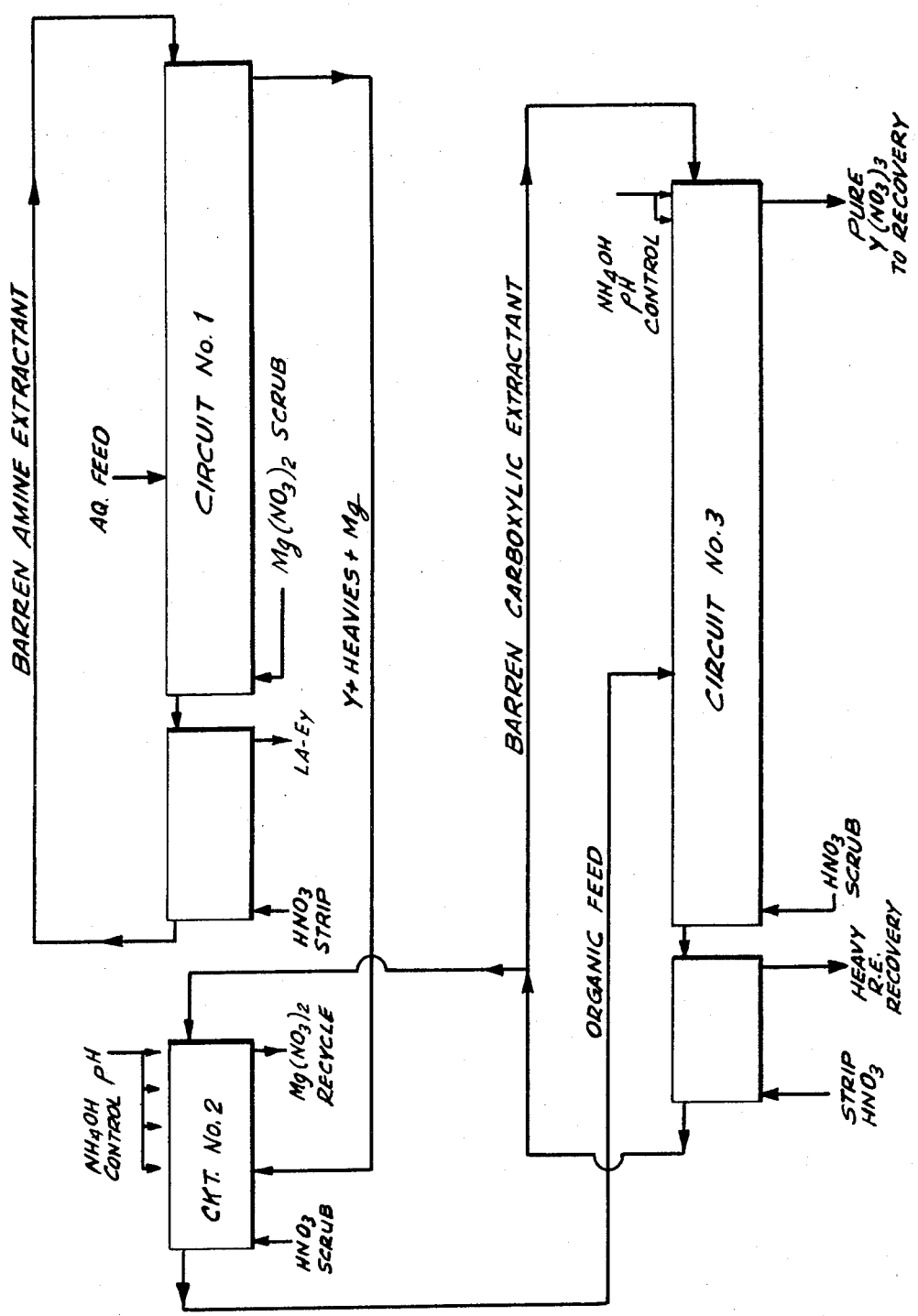
FIG. 2 flow diagrams a continuous process according to this invention wherein yttrium values and rare earth values are fed to three circuits, the light rare earth values are removed in the first in the presence of a salting out agent, the salting out agent is removed in the second and the heavy rare earths are removed in the third. The process is described in Example 10.

A continuous, two stage liquid-liquid extraction process according to this invention is carried out as explained in the Flow Diagram of FIG. 2. The system is fed an aqueous solution containing a 52 percent $Y_2O_3$/REO composition.

The apparatus comprises a conventional, multicell unit. Each cell consists of a mixer-settler pair. For a more detailed description of a suitable apparatus, reference is made to the disclosure in Treybal, "Liquid Extraction," 2nd Edition, McGraw Hill, 1963.

Referring to FIG. 2 of the drawings to assist in understanding the flow patterns:

I. There is fed to the amine extractant circuit, designated Circuit No. 1, an aqueous solution comprising 130 g./l. of $Y_2O_3$, 1.5 M $Mg(NO_3)_2$ and 250 g./l. of REO with the composition of Table I, Example 1. The following flow rates are used and the product and byproduct streams analyze as follows:

a. 15.81 volumes of tricaprylyl methyl ammonium nitrate, 40 percent by volume in Cyclosol–53, barren solvent $R_4N$ introduced to the raffinate out end of Circuit No. 1.
b. 1 vol. of said feed solution injected into Circuit No. 1.
c. 1.78 volumes of 1.5 M $Mg(NO_3)_2$ scrub and salting-out agent injected into the scrub end of Circuit No. 1.
d. 2.78 volumes of aqueous raffinate from Circuit No. 1. analyzing for 46 g./l. of REO and 43.3 g./l. $Y_2O_3$, 300 p.p.m. $Er_2O_3$, 6.06 percent $Yb_2O_3$—$Tm_2O_3$ and $Lu_2O_3$.
e. 4.4 volumes of strip solution, 4.0 N $HNO_3$, is used to strip loaded organic.
f. 4.4 volumes of strip aqueous from the strip end of Circuit No. 1 analyzing 20.0 g./l. REO, i.e., La-Er and 1.12 g./l. of $Y_2O_3$.

II. The aqueous raffinate stream from I(d) is fed to the intermediate acid extraction circuit designated as Ckt (Circuit)-2. The following rates are used and the product and byproduct streams analyze as follows:

a. 2.4 volumes of barren 50 percent 2-methyl-2-butyl-pentanoic acid in Cyclosol–53 is added to the barren solvent-in end of Circuit No. 2.
b. 1.0 volumes of aqueous raffinate from Circuit No. 1 analyzing 46 g./l. REO and 43.3 g./l. $Y_2O_3$, 300 p.p.m. $Er_2O_3$ and 6.06 percent $Yb_2O_3$—$Tm_2O_3$ and $Lu_2O_3$ is introduced to Circuit No. 2.
c. Aqueous ammonia added to Circuit No. 2 cells to maintain a pH profile of 4.0–5.8.
d. 0.4 volumes of 1.0 N $HNO_3$ scrub solution is added to the loaded solvent-out end of Circuit No. 2.

e. 2.4 volumes of loaded solvent leaves Circuit No. 2 analyzing 19.2 g./l. REO and 0.0001 g./l. of alkaline earth ion.

f. 1.4 volumes of aqueous magnesium nitrate leaves Circuit No. 2 as waste. (It can be recycled to Circuit No. 1.)

III.

a. 1.65 volumes of barren 50 percent 2-methyl-2-butyl-pentanoic acid in Cyclosol–53 solvent is fed to product out end of Circuit No. 3.

b. 1 volume of loaded solvent from Circuit No. 2 is injected into Circuit No. 3.

c. 0.36 volumes of 4.74 N Scrub $HNO_3$ solution is added to scrub end of Circuit No. 3.

d. 0.074 volumes of 3 N $HNO_3$ strip solution is added to strip end of Circuit No. 3.

e. 0.074 volumes of strip solution is withdrawn from strip circuit analyzing 15.9 g./l. REO and 0.12 g. per l. of $Y_2O_3$.

f. 0.17 volumes of aqueous ammonium hydroxide is added to maintain an aqueous pH of 3.5.

g. 0.53 volumes of $Y(NO_3)_3$ raffinate solution is withdrawn from Circuit No. 3 analyzing 35 g./l. of $Y_2O_3$.

The product stream consists of high purity yttrium values. Analyses by two different methods, mass spectrometric, designated Mass Spec, and X-ray excited optical fluorescence, designated XOF, are given in Table III:

TABLE III.—ASSAY OF YTTRIUM PRODUCT STREAM FOR RARE EARTH VALUES

| Rare earths as oxides | Content, parts per million | |
| --- | --- | --- |
| | Mass. spec. | XOF |
| $La_2O_3$ | 1 | |
| $CeO_2$ | 0.1 | |
| $Pr_6O_{11}$ | 1 | 1.6 |
| $Nd_2O_3$ | 1 | 1.0 |
| $Sm_2O_3$ | 1 | 0.7 |
| $Eu_2O_3$ | 0.4 | <0.1 |
| $Gd_2O_3$ | 1 | <3.5 |
| $Tb_4O_7$ | 0.2 | 2.9 |
| $Dy_2O_3$ | <0.3 | 0.14 |
| $Ho_2O_3$ | <0.1 | |
| $Er_2O_3$ | <0.2 | <3.0 |
| $Tm_2O_3$ | 0.2 | <3.0 |
| $Yb_2O_3$ | 0.5 | <7.0 |
| $Lu_2O_3$ | <0.1 | |

It is seen that the rare earth impurities have been reduced to very low values. Especially marked is the reduction in the so-called "critical" elements, holmium, erbium and dysprosium.

The yttrium is removed from the strip solution by precipitation with oxalic acid.

The process of the present invention can thus be used to advantage to selectively separate light and heavy rare earth values from an aqueous feed solution to isolate the desired yttrium values in an aqueous scrub solution.

The process of the present invention has distinct and advantageous uses in obtaining a high degree of separation of difficult to separate metals in aqueous solutions. The essential feature of the present process is the use in a continuous fashion of two extractant-solvents, each immiscible with the feed solution and each selective for a particular metal value or values to obtain in relatively few stages of extraction a higher degree of separation of the metal values than can be obtained using other extractant-solvents of the prior art alone or in combination and using substantially more stages of extraction.

The invention has many obvious applications in the mining industry and in the practice of metallurgy to recover heretofore difficulty separable metals economically and in commercially useful amounts.

The invention is not to be limited by the above description or examples which are given merely as illustrative. The scope of the invention is defined by the appended claims.

We claim:

1. A process for recovering yttrium values from an aqueous solution containing yttrium values in admixture with heavier and lighter rare earth values which comprises continuously:

a. contacting said solution with an amine as an extractant whereby said lighter rare earths are extracted into an organic phase while said yttrium values and said heavier rare earth values remain in the aqueous phase and separating said aqueous phase;

b. contacting the aqueous phase from step (a) with a (halodi- or trialkyl)alkanoic acid of from about eight to 11 carbon atoms as an extractant whereby said yttrium values and said heavier rare earth values are extracted into an organic phase and separating said organic phase;

c. contacting an organic phase from step (b) with an aqueous acid whereby said yttrium values are taken up into an aqueous acid scrub solution while said heavier rare earth values remain in said organic phase and separating said scrub solution; and d. recovering the yttrium values from the scrub solution from step (c).

2. A process as defined in claim 1 wherein a salting out agent is added to the solution in step (a) and said salting out agent remains in the aqueous phase together with the yttrium values and said heavier rare earth values.

3. A process as defined in claim 1 wherein the extractant in step (a) is a substantially water-insoluble mixture of tertiary alkyl primary amines having 18 to 21 carbon atoms or a substantially water-insoluble quaternary salt containing a total of from about 25 to 36 carbon atoms.

4. A process as defined in claim 3 wherein the extractant is tricaprylyl methyl ammonium nitrate.

5. A process as defined in claim 1 wherein the acid extractant in step (b) is a mixture of isomers of 2-methyl-2-butylpentanoic acid with an average molecular weight of about 174.

6. A process as defined in claim 1 wherein the extractants are dissolved in an organic diluent.

7. A process as defined in claim 6 wherein the extractant-diluent solution has a content of from 10 to 60 percent by volume of the extractant in the solvent.

8. A process as defined in claim 7 wherein the diluent is a hydrocarbon solvent comprising high boiling aromatics, the major constituents being the three isomeric trimethylbenzenes.

9. A process as defined in claim 2 wherein said salting out agent is a water soluble nitrate of an alkali metal, an alkaline earth metal, ammonia or an amine.

10. A process as defined in claim 9 wherein said salting out agent is magnesium nitrate.

11. A process as defined in claim 1 which is carried out continuously by the steps comprising:

a. contacting said solution in a first liquid-liquid solvent extraction circuit with a barren extractant comprising an amine and countercurrently scrubbing with a mineral acid solution containing said salting out agent whereby the lighter members of the rare earth group are transferred into the extractant leaving the yttrium values, the heavier rare earth values and the salting out agent in the aqueous phase;

b. contacting said aqueous phase in a second liquid-liquid circuit with a barren extractant comprising a water-insoluble (halodi- or trialkyl)alkanoic acid of from about eight to 11 carbon atoms and countercurrently scrubbing and stripping with a mineral acid solution whereby the yttrium values and the heavier rare earth values are transferred to the extractant, leaving the salting out agent in the aqueous phase;

c. contacting the extractant from step (b) in a third liquid-liquid circuit with a barren extractant comprising a (halodi- or trialkyl)alkanoic acid of from about eight to about 11 carbon atoms and countercurrently selectively scrubbing with a mineral acid solution whereby the yttrium values are transferred to the aqueous scrub solution, leaving the heavier rare earth values in the extractant and separating the scrub solution; and d. recovering the yttrium values from the separated scrub solution.

12. A process as defined in claim 11 wherein the extractant loaded with light rare earth values from the first circuit and the extractant loaded with heavy rare earths from the last circuit are each stripped with a mineral acid solution until barren and then recycled.

13. A process as defined in claim 11 wherein the aqueous mixture fed to the system contains one or more rare earth values with atomic number between 57 and 71 and yttrium values and, in step (a), said first circuit extractant is tricaprylyl methyl ammonium nitrate at 37 percent by volume in an aromatic hydrocarbon diluent, the scrubbing solution is an aqueous mineral acid at 2 N concentration, 3 M in magnesium nitrate, and lanthanum through erbium values, if present, load on the extractant, leaving yttrium values and thulium, ytterbium and lutetium values, if present, in the aqueous phase;

in step (b) the second circuit extraction is carried out at pH 4.0–5.8 and yttrium values and thulium, ytterbium and lutetium values, if present, load on the (halodi- or trialkyl)alkanoic acid extractant, leaving the salting out agent in the aqueous phase and in step (c) the loaded extractant is fed to the third liquid-liquid circuit, the scrubbing solution is 2.0 N aqueous mineral acid and yttrium values are stripped, leaving thulium, ytterbium and lutetium values, if present, loaded on the (halodi- or trialkyl)alkanoic acid extractant.

14. A process for recovering yttrium values from an aqueous solution containing yttrium values in admixture with heavier and lighter rare earth values which comprises continuously:

a. contacting said solution with an amine as an extractant whereby said lighter rare earths are extracted into an organic phase while said yttrium values and said heavier rare earth values remain in the aqueous phase and separating said aqueous phase;

b. contacting the aqueous phase from step (a) with 2-bromo-2-ethylhexanoic acid as an extractant whereby said yttrium values and said heavier rare earth values are extracted into an organic phase and separating said organic phase;

c. contacting the organic phase from step (b) with an aqueous acid whereby said yttrium values are taken up into an aqueous acid scrub solution while said heavier rare earth values remain in said organic phase and separating said scrub solution; and d. recovering the yttrium values from the scrub solution from step (c).

15. A process as defined in claim 14 wherein a salting out agent is added to the solution in step (a) and said salting out agent remains in the aqueous phase together with the yttrium values and said heavier rare earth values.

16. A process as defined in claim 14 wherein the extractant in step (a) is a substantially water-insoluble mixture of tertiary alkyl primary amines having 18 to 21 carbon atoms or a substantially water-insoluble quaternary salt containing a total of from about 25 to 36 carbon atoms.

17. A process as defined in claim 16 wherein the extractant is tricaprylyl methyl ammonium nitrate.

* * * * *